United States Patent [19]
Zabler et al.

[11] Patent Number: 5,510,989
[45] Date of Patent: Apr. 23, 1996

[54] SYSTEM FOR INFLUENCING THE TRAVEL DYNAMICS OF AN AUTOMOBILE

[75] Inventors: Erich Zabler, Stutensee; Uwe Kassner, Moeglingen; Bernd Maihoefer, Reutlingen, all of Germany

[73] Assignee: Robert Bosch GmbH, Stuttgart-Feuerbach, Germany

[21] Appl. No.: 447,499

[22] Filed: May 23, 1995

Related U.S. Application Data

[63] Continuation of Ser. No. 113,057, Aug. 25, 1993, abandoned.

[30] Foreign Application Priority Data

Aug. 29, 1992 [DE] Germany .......................... 42 28 893.2

[51] Int. Cl.⁶ .............................. B62D 6/00; B60G 21/00
[52] U.S. Cl. .................. 364/424.05; 364/426.01
[58] Field of Search .................. 364/424.05, 426.01, 364/426.02, 426.03

[56] References Cited

U.S. PATENT DOCUMENTS

| | | | |
|---|---|---|---|
| 3,304,787 | 2/1967 | Chiku et al. | 73/517 |
| 3,693,425 | 9/1972 | Starita et al. | 73/517 |
| 4,342,227 | 8/1982 | Petersen et al. | 73/517 |
| 4,897,776 | 1/1990 | Urababa et al. | 364/424.05 |
| 5,033,770 | 7/1991 | Kamimura et al. | 364/424.05 |
| 5,038,306 | 8/1991 | Kellett | 364/424.05 |
| 5,092,624 | 3/1992 | Fukuyama et al. | 364/424.05 |
| 5,159,555 | 10/1992 | Wada | 364/424.05 |
| 5,180,026 | 1/1993 | Mori | 180/140 |
| 5,253,174 | 10/1993 | Inagaki et al. | 364/424.05 |
| 5,381,335 | 1/1995 | Wolf | 364/424.05 |
| 5,384,705 | 1/1995 | Inagaki et al. | 364/424.05 |
| 5,408,411 | 4/1995 | Nakamura | 364/424.01 |

FOREIGN PATENT DOCUMENTS

| | | |
|---|---|---|
| 9000735 | 1/1990 | WIPO. |
| WO90/00735 | 1/1990 | WIPO. |

OTHER PUBLICATIONS

International Congress on Transportation Electronics Proceedings of Oct. 17–18, 1988 entitled "The Next Step in Automotive Electronic Control".

*Primary Examiner*—Kevin J. Teska
*Assistant Examiner*—Tyrone V. Walker
*Attorney, Agent, or Firm*—Baker & Daniels

[57] ABSTRACT

A system for influencing the travel dynamics of an automobile includes at least two sensor units (S1, S2, S3) for capturing the movements of the vehicle. First evaluation units (A1) evaluate the signals of the sensor units, these first evaluation units being spatially combined with the aforementioned sensor units to a sensor module (10). Connected with the first evaluation units by linkage mans (11), second evaluation units (A21, A22, A23, A24) process the signals processed in the first evaluation units, dependent on a regulation and/or control objective, to activation signals for actuators which influence the vehicle movements.

17 Claims, 2 Drawing Sheets

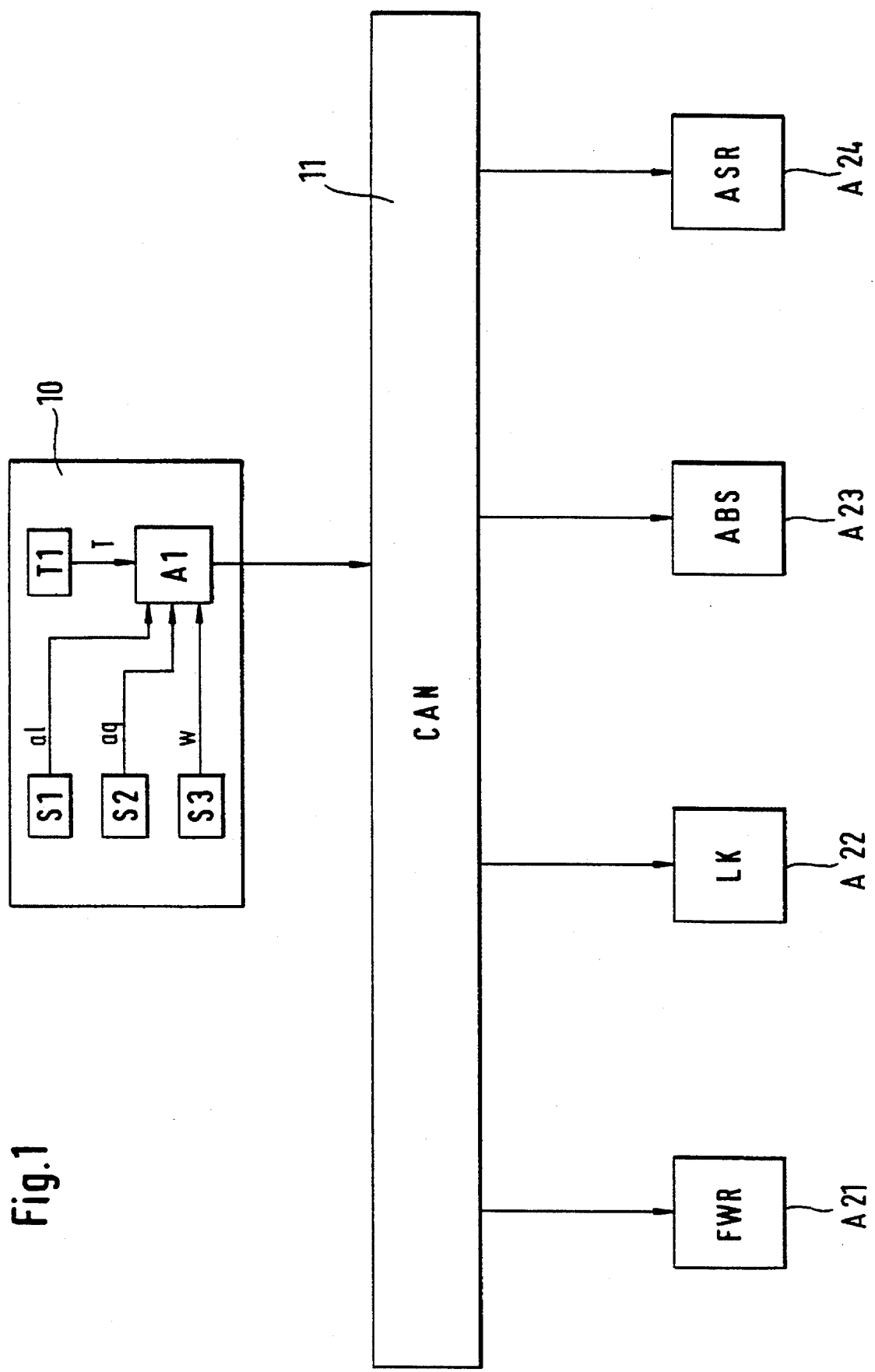

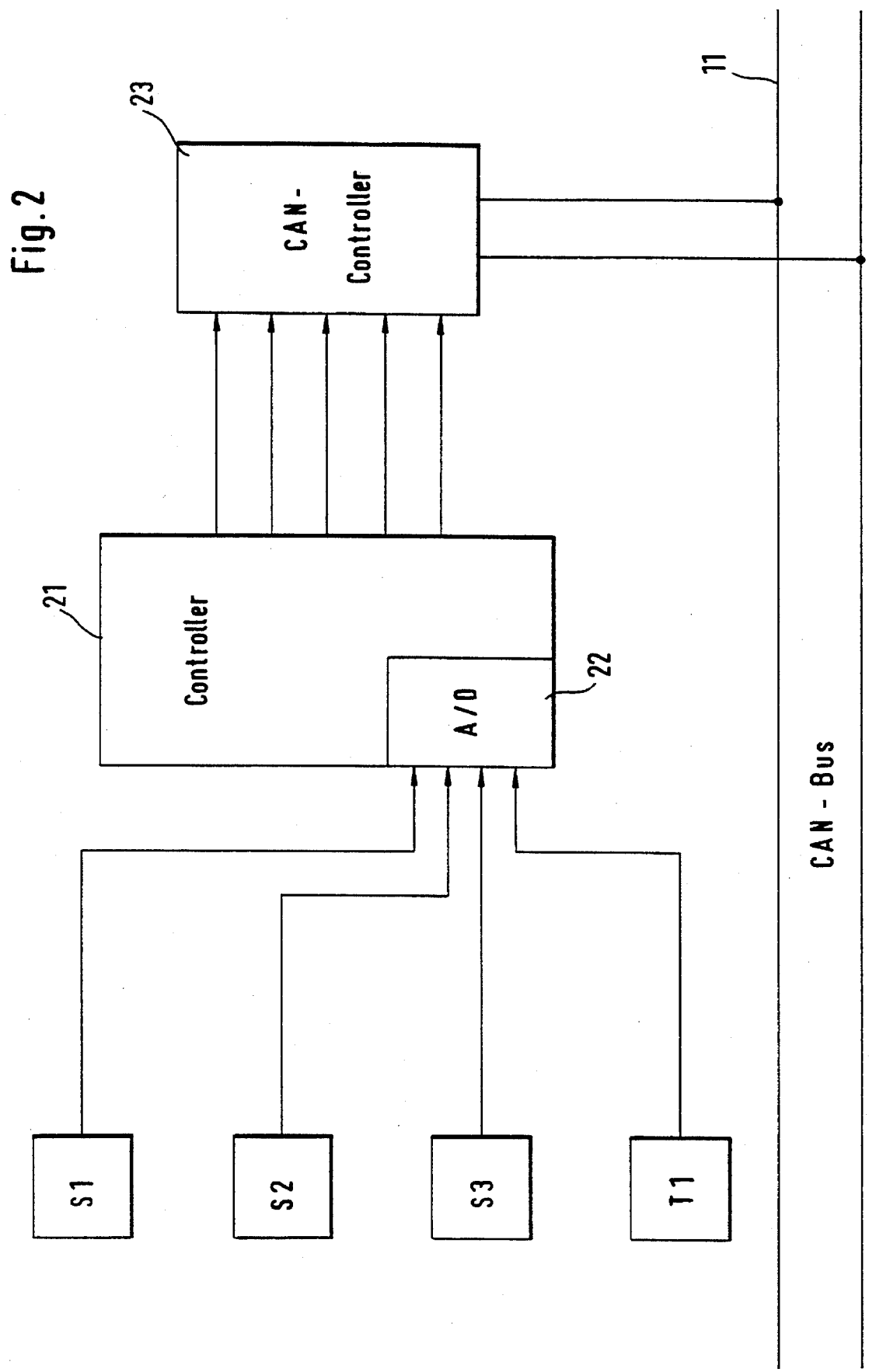

SYSTEM FOR INFLUENCING THE TRAVEL DYNAMICS OF AN AUTOMOBILE

This is a continuation of application Ser. No. 08/113,057, filed Aug. 25, 1993, now abandoned.

BACKGROUND OF THE INVENTION

1. Field of the Invention

The invention concerns a system for influencing the travel dynamics of an automobile.

2. Description of the Related Art

In the future, automobiles can be expected to increasingly be outfitted with complex systems for control and/or regulation of the travel performance. Known are systems for braking regulation and/or control [locking preventers (ABS), braking slip regulators], systems for drive slip regulation (ASR), systems for steering control and/or regulation (four-wheel steering), systems for chassis regulation and/or control (preferably for influencing the vertical motion of the vehicle), systems for travel dynamics regulation (preferably for influencing the movement about the longitudinal and vertical axes of the vehicle), systems for electronic transmission control of a vehicle, and systems for engine management. Such systems are presented, e.g., in the article "The next step in automotive electronic control" Convergence 88, pp. 83–89.

Common to such systems is that they need information on the movement of the vehicle relative to the road. Required here, first of all, is measuring the vehicle's longitudinal, transverse and yaw movements with suitable sensors.

Known from the patent application WO 90/00735 are sensors of micromechanical design, where force components respectively linear accelerations and/or angular accelerations are measured in several dimensions.

The German patent disclosure 37 69 508 proposes sensors of micromechanical design which detect the tilt movements of an automobile in at least two tilt axes. This makes it possible to trigger passenger safety devices, such as belt tightener, airbag, emergency blinking system and roll-over bar, whenever the vehicle exceeds certain limits for the tilt movements being sensed.

SUMMARY OF THE INVENTION

Proposed is a system for influencing the travel dynamics of an automobile where at least two sensor units are provided for capturing the movements of the vehicle. First evaluation units evaluate the signals of the sensor units, these first evaluation units being spatially combined with the aforementioned sensor units to a sensor module. By linkage means connected with the first evaluation units, second evaluation units process the signals processed in the first evaluation units—depending on the regulation and/or control objective—to activation signals of actuators which influence the vehicle movements.

The sensor units are preferably configured for capturing the longitudinal and/or transverse and/or yaw movements of the vehicle. The sensors for the longitudinal, transverse and yaw movements are arranged centrally in a controller of their own, the so-called sensor module, with the latter communicating with the controllers for the various vehicle functions (chassis control, steering, ABS, ASR, etc.) by way of a serial bus (for instance CAN, Controller Area Network). The advantages deriving thereof are that the sensor module needs only as many lead-in wires as are required for the bus system and the power supply. This leads inventionally to a smaller number of lines which need to be run to the sensor module via plugs.

The invention provides for configuring the first evaluation units for filtering the sensor signals, specifically for eliminating high-frequency interference shares induced by the chassis and/or the vehicle drive, and/or for compensation of nonlinearities of the sensor signals, specifically for compensation of temperature dependencies of the sensor signals, and/or for making allowance for the transverse sensitivity of the sensor units and/or for monitoring the sensor units and/or for mathematical transformation of the sensor signals onto any point of the vehicle, particularly onto the center of gravity of the vehicle.

Ensuing advantages are:

Generally necessary, the temperature compensation of the sensor characteristic curves requires only a single temperature sensor which is preferably arranged in, or in the region of, the sensor module and measures the temperature to which the sensor units are exposed.

Transverse sensitivities of the sensors can be corrected already in the sensor module. Meant by the notion transverse sensitivity is that, e.g., a sensor measuring accelerations in the longitudinal direction of the vehicle, due to its mechanical configuration, makes allowance also for components of the acceleration in the transverse direction of the vehicle. When correcting for instance the sensor signals of the sensor for the longitudinal movement of the vehicle by the transverse shares of movement measured by another sensor of the module, corrected data of longitudinal movement are obtained. Thus, the sensor signals of at least one sensor unit are corrected dependent on the sensor signal of at least one other sensor unit, so as to make allowance for the transverse sensitivities of the sensor units. This occurs in the first evaluation units, which preferably are configured digitally as microcontrollers (processor IC).

The transformation of measured values of the sensor units onto any point of the vehicle, particularly onto the center of gravity of the vehicle, with a selective installation site of the sensor module is simplified by a reduced number of parameters. This reduces the applicational expense and holds out an increased accuracy of the calculations.

The measured values of the sensor modules can be utilized by a number of controllers.

Especially the micromechanical representation of the sensors on a chip yields advantages in tuning, temperature response and cost.

The reduction of the number of lines to be run via plugs to the module is advantageous as well.

Due to the spatial separation from other control devices to which the corrected sensor signals are transmitted, the sensor module can be installed in the vehicle interior, providing options for cost-effective casing designs.

Complete independence of the sensor module from the type of vehicle, respectively from the vehicle equipment, along with a standardization of the sensor module and its hook-up via a standard bus, for example the popular CAN bus, makes for low manufacturing costs.

The sensor units preferably capture longitudinal and/or transverse and/or yaw velocities of the vehicle.

Newly conceived according to the invention, the structure for the electronically controlled systems in the automobile provides for a greater modularity of the hardware components. The various control devices exchange information by way of the CAN serial bus system, enabling a coordination of individual partial functions. This applies to both engine management and transmission, brakes, chassis, etc.

The objective of the inventional system is defining a building block setup with standardized modules from which comprehensive electronic systems can be assembled.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIGS. 1 and 2 show block diagrams of an embodiment of the inventional system.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

In FIG. 1, the sensor module 10 is by way of linkage means 11 connected to the evaluation units A21, A22, A23, and A24. In the sensor module 10, the signals al, aq and w are passed to the sensor units S1, S2 and S3 of the first evaluation unit A1. Furthermore, the output signal T of the temperature sensor T1 prevails on the first evaluation unit A1.

The sensor units S1, S2 and S3 capture in known fashion the longitudinal, transverse and yaw movements of the vehicle, preferably as longitudinal and transverse acceleration of the vehicle, as well as the yaw movement as the yaw velocity or as yaw acceleration. Considered as yaw movement of the vehicle is here a pivot about the vertical axis of the vehicle.

Aside from the accelerations respectively velocities to be detected, the output signals of the sensors S1, S2 and S3 depend on the ambient temperature. The ambient temperature of the sensor units is captured by the temperature sensor T1. With the sensor units S1, S2 and S3 now arranged together within minimal space, for example on a chip of micromechanical design, a temperature sensor on this chip can measure the common ambient temperature.

The temperature effects of the sensor characteristic curves can then be allowed for in the first evaluation units A1, so that temperature-corrected sensor signals representing the vehicle movements prevail on the outputs of the evaluation units A1.

It is also known that acceleration sensors (S1, S2) and rate of rotation sensors (S3) possess so-called transverse sensitivities. That is, these sensors measure not only the acceleration or velocity components for which they are duly configured, but measure also acceleration or velocity components acting in directions other than the accelerations or velocities to be duly captured. Thus, for instance a rotation rate sensor (S3) configured as piezo sensor also measures shares of the transverse and longitudinal accelerations. The sensor signals of the transverse and longitudinal acceleration sensors are equally dependent on one another. These dependencies are generally known at the time of sensor configuration and can be electronically stored, for instance via characteristic curves, in the first evaluation units A1. With the signals of all sensor units now being transmitted to the first evaluation unit A1, these signals can be corrected making allowance for the respectively other sensor signals.

The controllers, or second evaluation units, A21, A22, A23 and A24 generally require the corrected sensor signals which represent the longitudinal, transverse and yaw movements of the vehicle in the mass or area center of gravity. Due to the sensor module size and the space available in the vehicle, it is often not possible to arrange the sensor module in the mass or area center of gravity of the vehicle. If the sensor module now is not situated in the center of gravity of the automobile, the output signals of the sensor units S1, S2 and S3 can be transformed in a simple manner, in the first evaluation units A1, onto the center of the gravity of the vehicle. Necessary therefor are merely the vehicle geometry and the position of the sensor module.

Prevailing on the outputs of the sensor module 10 are thus the sensor signals corrected for temperature, transverse sensitivity and center of gravity. These signals can now be processed by a number of controllers A21, A22, A23 and A24. The transfer from the sensor module 10 to the controllers respectively further evaluation units A21, A22, A23 and A24 is handled by means of a serial bus system, in which context especially the CAN (Controller Area Network) bus system comes to mind. This enables a coordination of individual partial functions.

Information on the vehicle movements can now be called up, via the bus system, from the travel dynamics regulation or travel dynamics control systems A21, A22, A23 and A24. Depending on the output signals of the sensor module 10, the characteristic of the vehicle suspension is modified, for instance in a chassis regulating or chassis control system A21 (FWR). To that end, specifically actuators between the vehicle body and the wheel units are activated for exertion of forces between the vehicle body and the wheel units.

Dependent on the output signals of the sensor module 10, systems for steering regulation and/or control A22 (LK) effect the steering deflection at the front and rear axles.

ABS or ASR controllers, in contingence on the output signals of the sensor module 10, control and/or regulate braking operations and/or perform interventions in the vehicle drive.

An embodiment of the system according to the invention is presented in detail in FIG. 2.

Featuring preferably analogous magnitudes, the output signals of the sensor units S1, S2, and S3 as well as the output signal of the temperature sensor T1 are transmitted to an analog/digital converter 22 (A/D). Now available in digital form, the output signals of the sensor units S1, S2, S3 and T1 are digitally processed in the fashion described above, in the controller 21. Available on the output of the controller 21 are the sensor signals corrected for temperature and/or transverse sensitivity and/or center of gravity. These signals are passed on to the CAN controller 23, which enters these data in a CAN bus 11.

Newly conceived according to the invention, the structure for the electronically controlled systems in the automobile provides for a greater modularity of the hardware components. The various controllers exchange information by way of the CAN serial bus system, enabling a coordination of individual partial functions. This applies to both engine management and transmission, brakes, chassis, etc. The objective of the inventional system is defining a building block setup with standardized modules from which comprehensive electronic systems can be assembled.

Defined as an element of this building block setup is the sensor module, which independently of any mechanical transfer captures the kinetic state of the vehicle, capturing for example the acceleration in the longitudinal axis of the vehicle, the acceleration in the direction of the transverse axis, and the angular velocity about the vertical axis.

The captured values need to be processed by a processor and made available to the CAN serial data bus via a suitable module.

The sensor module is characterized in that only wires for the power supply and the CAN bus extend outward from the sensor module. The sensor elements for measuring the acceleration and the rate of rotation are to be accommodated in the housing 9, along with an evaluation circuit.

Possible applications for the inventional system are:

improved estimation of wheel slip for locking preventers respectively braking slip regulators, coordinated interaction of intelligent chassis, electronic steering and brake regulating systems, and travel dynamics regulations.

The compensation for transverse sensitivities of the sensors, that is, the mutual correction of the measured values of the individual sensor units, can be carried out in toto in the sensor module. No data exchange is required therefor between the controllers A21, A22, A23 and A24.

The transformation of measured values onto a vehicle center of gravity with a selective installation site of the sensor module is simplified by a reduced number of parameters. The applicational expense is reduced, and an increased accuracy of the calculations is given as well.

The measured values of such a sensor module can be utilized by a number of controllers.

Owing to the spatial separation from other controllers, installation in the vehicle interior is possible, with the option of using a low-cost casing with a small number of lead-in wires. The complete independence of the sensor module from the vehicle type and equipment as well as the achievable standardization promise low manufacturing costs.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for influencing travel dynamics of a vehicle, the vehicle including a plurality of actuators which influence movements of the vehicle, said system comprising:

first and second sensors for respectively sensing first and second movements of the vehicle and for providing respective first and second sensor output signals corresponding thereto, said first and second sensors mounted in close proximity to each other whereby vehicle movements and environmental influences affecting each of said sensors are substantially the same for each of said sensors, said first and second sensors including transverse sensitivities whereby said first and second sensor output signals respectively include components due to said respective second and first movements of said vehicle and which respective second and first movements are not desired to be measured by said respective first and second sensors;

a first evaluation means for performing a first evaluation of said first and second sensor output signals and for providing corrected sensor output signals, said first evaluation comprising correcting for said transverse sensitivities of said first and second sensors by correcting said first sensor output signal as a function of said second sensor output signal based on characteristic dependency curves;

a second evaluation means for activating one of a said actuators; and linkage means for electronically connecting said first evaluation means and said second evaluation means.

2. The system of claim 1, wherein said first and second sensors each sense at least one of longitudinal movements, transverse movements, and yaw movements of the vehicle.

3. The system of claim 2, wherein said first and second sensors each sense at least one of longitudinal accelerations, transverse accelerations, yaw accelerations, and yaw velocities of the vehicle.

4. The system of claim 1, said first evaluation comprising at least one of:

filtering said sensor output signals;

compensating for non-linearities of said sensor output signals;

monitoring said sensors; and mathematically transforming said sensor signals dependent on the location of said sensors relative to a predetermined geometric location in the vehicle.

5. A system for influencing travel dynamics of a vehicle, the vehicle including a plurality of actuators which influence movements of the vehicle, said system comprising:

first and second sensors for sensing first and second movements of the vehicle and for providing respective first and second sensor output signals corresponding thereto, said first and second sensors mounted in close proximity to each other whereby vehicle movements and environmental influences affecting each of said sensors are substantially the same for each of said sensors, said first and second sensors including transverse sensitivities whereby said first and second sensor output signals respectively include components due to said second and first movements of said vehicle and which respective second and first movements are not desired to be measured by said respective first and second sensors, said first and second sensor output signals being dependant on the location of said sensors in the vehicle;

a first evaluation means for performing a first evaluation of said first and second sensor output signals and for providing corrected sensor output signals, said first evaluation comprising mathematically transforming said first and second sensor output signals onto a predetermined geometric location in the vehicle;

a second evaluation means for activating one of a said actuators; and linkage means for electronically connecting said first evaluation means and said second evaluation means.

6. The system of claim 1, wherein the vehicle comprises a chassis and a drive, said first evaluation comprising at least one of:

filtering out high-frequency interference signals from said sensor output signals, said interference signals induced by at least one of said chassis and said drive;

compensating for non-linearities of said sensor output signals caused by temperature characteristics of said sensors;

monitoring said sensors; and mathematically transforming said sensor signals dependent on the location of said sensors relative to the center of gravity of the vehicle.

7. The system of claim 6, further comprising a temperature measuring sensor disposed in close proximity to said sensors.

8. The system of claim 1, wherein said first evaluation means comprises a digital microcontroller.

9. The system of claim 1, wherein said second evaluation means performs at least one of chassis regulation, chassis control, steering regulation, steering control, brake regulation, brake control, drive regulation, and drive control.

10. The system of claim 1, wherein said linkage means comprises a serial bus.

11. The system of claim 1, wherein said first and second sensors are disposed on a microchip.

12. The system of claim 1, further comprising a housing, said first and second sensors and said first evaluation means disposed within said housing, said housing, said first and second sensors, and said first evaluation means defining a sensor module.

13. The system of claim 12, further comprising a temperature measuring sensor disposed within said housing, said housing, said temperature measuring sensor, said first and second sensors, and said first evaluation means defining said sensor module.

14. The system of claim 13, wherein said second evaluation means is disposed exterior of said sensor module.

15. The system of claim 1, wherein said at least two sensors and said first evaluation means are mounted on a printed circuit board.

16. A system for influencing travel dynamics of a vehicle, the vehicle including a plurality of actuators which influence movements of the vehicle, said system comprising:

first and second sensors for sensing first and second movements of the vehicle and for providing respective first and second sensor output signals corresponding thereto, said first and second sensors mounted in close proximity to each other whereby vehicle movements and environmental influences affecting each of said sensors are substantially the same for each of said sensors, said first and second sensors including transverse sensitivities whereby said first and second sensor output signals respectively include components due to said second and first movements of said vehicle and which respective second and first movements are not desired to be measured by said respective first and second sensors;

a first evaluation means for performing a first evaluation of said first and second sensor output signals and for providing corrected sensor output signals, said first evaluation comprising monitoring said first and second sensors, and calculating a corrected sensor output signal;

a second evaluation means for activating one of a said actuators; and linkage means for electronically connecting said first evaluation means and said second evaluation means.

17. The system of claim 5, wherein said first evaluation comprises correcting for said transverse sensitivities of said sensors by correcting said first sensor output signal based on said second sensor output signal.

\* \* \* \* \*